(12) United States Patent
Costa et al.

(10) Patent No.: US 10,669,374 B2
(45) Date of Patent: Jun. 2, 2020

(54) METHOD TO MINIMIZE THE TRANSITION TIME FROM ONE POLYMER GRADE TO ANOTHER POLYMER GRADE IN A POLYMERIZATION PLANT

(71) Applicant: Sulzer Chemtech AG, Winterthur (CH)

(72) Inventors: Liborio Ivano Costa, Winterthur (CH); Fabio Codari, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 164 days.

(21) Appl. No.: 15/510,046

(22) PCT Filed: Sep. 1, 2015

(86) PCT No.: PCT/EP2015/069941
§ 371 (c)(1),
(2) Date: Mar. 9, 2017

(87) PCT Pub. No.: WO2016/037901
PCT Pub. Date: Mar. 17, 2016

(65) Prior Publication Data
US 2017/0240699 A1    Aug. 24, 2017

(30) Foreign Application Priority Data
Sep. 11, 2014  (EP) .................................. 14184404

(51) Int. Cl.
*C08G 63/78*     (2006.01)
*C08G 63/08*     (2006.01)
*G05B 1/00*      (2006.01)

(52) U.S. Cl.
CPC .......... *C08G 63/785* (2013.01); *C08G 63/08* (2013.01)

(58) Field of Classification Search
CPC ...... G05B 13/0275; G05B 1/00; C08G 63/08; C08G 63/785
See application file for complete search history.

(56) References Cited

U.S. PATENT DOCUMENTS

| | | | |
|---|---|---|---|
| 5,627,242 | A | 5/1997 | Jacobsen et al. |
| 7,343,225 | B2 | 3/2008 | Hartley et al. |
| 7,993,554 | B2 | 8/2011 | Schlummer et al. |
| 2004/0063871 | A1 | 4/2004 | Parrish et al. |
| 2010/0324738 | A1 | 12/2010 | Lewalle |

FOREIGN PATENT DOCUMENTS

| | | |
|---|---|---|
| CN | 101846976 A | 9/2010 |
| CN | 103116274 A | 5/2013 |
| EP | 1099715 A1 | 5/2001 |
| EP | 1840140 A1 | 10/2007 |
| EP | 2216347 A1 | 8/2010 |
| RU | 2394843 C2 | 7/2010 |
| SU | 427953 A1 | 5/1974 |
| SU | 527446 A1 | 5/1976 |
| TW | 200829409 A | 7/2008 |

OTHER PUBLICATIONS

Kitagawa et al "Operation and Control of Polymerization Reaction", Polymer Synthesis, V.19, Issue 215, 1970,pp. 84-91—Human Translation (Year: 1970).*
JP Office Action for JP 2017-513802 Mailed to Applicant dated Jun. 4, 2019 (Year: 2019).*
Vega et al "Control of a Loop Polymerization Reactor Using Neural Networks", Braz. J. Chem. Eng. v.17 n. 4-7 São Paulo dez. 2000 (Year: 2000).*
Biegler et al "Optimal Grade Transitions in the High-Impact Polystyrene Polymerization Process", Ind. Eng. Chem. Res. 2006, 45, 6175-6189 (Year: 2006).*
Gudi et al "Optimal Grade Transition in Polymerization Reactors: A Comparative Case Study",Ind. Eng. Chem. Res. 2006, 45, 3583-3592 (Year: 2006).*
Costa et al "On PLA polymerization process simulation and optimization, selected modeling case studies", Apr. 2015 (Year: 2015).*
Shinmura, Kojien, 4th edition, Nov. 15, 1991, p. 1483.
Polymer, 1970, vol. 19, No. 215, 84-91.
Rawatlal, R. et al: Development of an Unsteady-State Model for Control of Polymer GradeTransitions in Ziegler-Natta Catalyzed Reactor Systems, Mecromolecular Syposia, Dec. 1, 2007, pp. 80-89, vol. 260, No. 1.
Sirohi, A. et al. "On-Line Parameter Estimation in a Continuous Polymerization Process", American Chemical Society 1996, pp. 1332-1343, vol. 35.
Ali, M. et al. "Control of Polyethylene Properties using Nonlinear Model Predictive Control", 2008, Department of Chemical Engineering—King Saud University.

(Continued)

*Primary Examiner* — Ling Siu Choi
*Assistant Examiner* — Gennadiy Mesh
(74) *Attorney, Agent, or Firm* — Larson & Anderson, LLC

(57) ABSTRACT

A method is provided which reduces the transition time and/or the polymer waste in a continuous polymerization plant and/or process having a back-mixing reactor when polymer grades are changed from a first polymer grade to a second polymer grade. A monomer(s) and processing agent(s) are introduced to the reactor. The concentration of the processing agent(s) in a feed stream to the reactor is varied as a function of time from a first value associated with the first polymer grade to a final value associated with the second polymer grade. During the concentration variation one or more intermediate values of processing agent concentration are adjusted between at a first value, an intermediate value(s), and a final value. The intermediate values may be maintained for a time which is calculated on the basis of only residence time and steady-state correlations between input and output of the reactor and/or of the polymerization plant. The method is performed without performing dynamic modelling.

12 Claims, 4 Drawing Sheets

(56) References Cited

OTHER PUBLICATIONS

Bonvin, D. et al.: "Optimal grade transition for polyethylene reactors via NCO tracking", Trans IChemE, Part A, Chemical Engineering Research and Design, Aug. 2005, pp. 1-6, vol. 83.
Madhuranthakam, C et al.: "Dynamic Modelling & Optimization of AN/Bd (NBR) Emulsion Copolymerization in a Continuous Reactor Train" University of Waterloo, Institute of Polymer Research, 30th Symposium on Polymer Science/Engineering, May 13, 2008.

* cited by examiner

METHOD TO MINIMIZE THE TRANSITION TIME FROM ONE POLYMER GRADE TO ANOTHER POLYMER GRADE IN A POLYMERIZATION PLANT

The present invention relates to a method for reducing the transition time and/or the polymer waste being out of the specification during the change from a first polymer grade to a second polymer grade in a continuous polymerization process conducted in a polymerization plant.

On account of the broad range of properties of polymers, which may be tailored to the intended use of the polymer by adjusting one or more of the polymer characteristics, such as the chemical composition of the polymer, the stereochemistry of the polymer, the molecular weight of the polymer and the like, polymers play an essential role in industry. Polymers are produced by polymerization of monomers and, if necessary, co-monomers in a polymerization plant, which comprises one or more polymerization reactors.

One example therefor is the polymerization of lactide, which is the cyclic diester of lactic acid, to polylactic acid in a polymerization plant. Polylactic acid polymers are of particular interest, because they are made from renewable resources and are biodegradable. Moreover, the technological properties of these polymers come quite close to those of polymers from petrochemical origin, which is the reason why these polymers are regarded as a highly promising substitute for polymeric materials from petrochemical origin. For example, polylactic acid has a wide range of applications in the biomedical field, namely e.g. in chirurgical implants, in films, such as e.g. in packaging, fibers, such as e.g. for garments, hygienic articles, carpets and in disposable plastic products, such as e.g. disposable cutlery or containers. Moreover, polylactic acid has found a wide application in composite materials, such as in fiber-reinforced plastics.

Typically, polylactic acid is produced by polymerizing lactide in a polymerization plant comprising, in series, a loop reactor and a plug flow reactor. While the lactide is polymerized in the loop reactor to an extent of 30 to 70%, the mixture drawn off from the loop reactor is further polymerized in the downstream plug flow reactor up to more than 70% and typically to 95 to 97% monomer conversion. In this case, the feed into the loop reactor comprises lactide as monomer, a catalyst, such as tin octoate, an initiator, such as a high-boiling alcohol, and, optionally, one or more co-monomers, whereas the product stream drawn off from the plug flow reactor consists essentially of the polylactic acid product and residues of non-converted monomer, non-converted co-monomer, non-consumed catalyst, non-consumed initiator, non-consumed co-catalyst and, if present, one or more by-products. Mainly, the reaction kinetics are determined by the feed composition and the reaction temperature, wherein polymer having the required characteristics, such as the required molecular weight, polydispersity, stereochemistry and/or others, may be tailored to the intended later use of the polymer by properly selecting the feed composition. For example, the number average molecular weight of the polymer is inversely proportional to the concentration of the initiator in the feed introduced into the polymerization reactor(s).

Thus, polymers of different grade, i.e. of different molecular weight, can be produced in one plant by simply changing the concentration of the initiator in the feed. However, as the molecular weight of the polymer produced in the polymerization reactor, which usually comprises one or more back-mixing reactors, such as the aforementioned loop reactor, does—on account of the residence time of the reaction mixture in the reactor, as a consequence of which the concentration in the polymerization reactor does not immediately follow the concentration change in the feed, but only time-delayed—not instantaneously follow the change of the concentration of initiator in the feed, but needs a significant time, which is called transition time, to conform with the changed feed, a considerable amount of off-specification polymer is produced during the transition time, i.e. during the transition from one polymer grade to another polymer grade. Since the off-specification polymer has no commercial value, it has to be discarded. On account of this reason, it is desirable to minimize the transition time between the change from a first polymer grade to a second polymer grade in a continuous polymerization process, in order to minimize the amount of off-specification polymer.

In order to address this problem, US 2010/0324738 A1 discloses a method for reducing the transition time and amount of off-specifications polyolefin produced during the change of specification from one homo- or co-polymer grade to another in a double loop slurry reactor with a Ziegler-Natta or a metallocene catalyst system, wherein this method uses mathematical constraints based on a dynamic model considering output characteristics as a function of the input characteristics. In other words, the method described in US 2010/0324738 A1 is based on real time dependent calculations, which are complex and inaccurate, because they might not consider all parameters required. In the present application, such mathematical methods are referred to as "dynamic modeling".

In order to perform such a method based on dynamic models accurately, characteristics of the produced polymer have to be measured and/or estimated and the measured and/or estimated results have to be compared by a software with the input characteristics, wherein a controller controls the system based on the so obtained correlation of measured output characteristics to the input characteristics. The apparatus for controlling the system based on such dynamic correlations is referred to as a "controller" in the present application. However, this requires that sensors and a controller, such as a proportional-integrated-derivative (PID) controller, are used, which makes the whole method expensive and complex.

Thus, the object underlying the present invention is to provide a method for reducing the transition time and/or the polymer waste being out of the specification during the change from a first polymer grade to a second polymer grade in a continuous polymerization process conducted in a polymerization plant, which is easy to carry out, which is accurate, and which does not require a controller, sensor(s) and dynamic model calculations.

In accordance with the present invention, this object is satisfied by providing a method for reducing the transition time and/or the polymer waste being out of the specification during the change from a first polymer grade to a second polymer grade in a continuous polymerization process conducted in a polymerization plant, wherein the polymerization plant comprises at least one back-mixing reactor, at least one monomer and at least one processing agent selected from the group consisting of catalysts, co-catalysts, polymerization initiators, co-monomers, chain-transfer agents, branching agents, solvents and arbitrary combinations of two or more of the aforementioned agents are added before and/or during the polymerization process into the at least one back-mixing reactor, wherein the concentration of one or more of the at least one added processing agent in the feed introduced into the at least one back-mixing reactor is varied as a function of time from a first value associated with the first polymer grade to a final value associated with the second polymer grade, the first polymer grade and the second polymer grade are one or more parameters related to the molecular weight of the polymer to be produced and/or one or more parameters related to the composition of the polymer to be produced and/or one or more parameters related to the structure of the polymer to be produced and/or one or more parameters related to the amount of the polymer to be produced, wherein during the variation of the concentration of the at least one added processing agent from the first value to the final value one or more intermediate values are adjusted, wherein at least one of the one or more intermediate values is closer to the final value than to the first value, wherein the absolute difference between the at least one of the one or more intermediate values from the first value is greater than the absolute difference between the final and the first value, wherein the one or more intermediate values are maintained for a time which is calculated on the basis of only residence time in the at least one back-mixing reactor and steady-state correlations between input and output of the reactor and/or of the polymerization plant, and wherein the method is performed without performing dynamic modelling.

Preferably, the majority of the intermediate values is closer to the final value than to the first value and the absolute difference between each of the majority of the intermediate values from the first value is greater than the absolute difference between the final and the first value.

More preferably, all of the intermediate values are closer to the final value than to the first value and the absolute difference between each of all of the intermediate values from the first value is greater than the absolute difference between the final and the first value.

This solution bases on the finding that by performing the transition between a first polymer grade to a second polymer grade in a continuous polymerization process conducted in a polymerization plant, which comprises at least one back-mixing reactor, by varying the concentration of a processing agent, such as the catalyst, co-catalyst, polymerization initiator, chain-transfer agent, branching agent, solvent and/or co-monomer(s), from a first value (which is for example a value of the concentration of initiator necessary in the feed introduced into the first polymerization reactor to obtain polylactic acid having a first molecular weight at the polymerization plant outlet) to the final value (which is for example the value of the concentration of initiator necessary in the feed introduced into the first polymerization reactor to obtain polylactic acid having a second molecular weight at the polymerization plant outlet) via one or more intermediate values, wherein at least one, preferably the majority and more preferably all of the one or more intermediate values are closer to the final value than to the first value, wherein the absolute difference between the at least one, preferably each of the majority and more preferably each of all of the one or more intermediate values from the first value is greater than the absolute difference between the final and the first value, and wherein the one or more intermediate values are maintained for a time which is calculated on the basis of only residence time in the at least one back-mixing reactor and steady-state correlations between input and output of the reactor and/or of the polymerization plant, the transition time between the first polymer grade and the second polymer grade is reduced in an easy and accurate manner, without needing any kind of controller (in particular PID controller), sensor(s) and dynamic model calculations.

Preferably, the concentration of at least one of the added processing agents is decreased from a first value to one or more intermediate values and then increased from the last intermediate value to the final value, wherein the one or more intermediate values are lower than the final value, or alternatively, the concentration of at least one of the added processing agent is increased from the first value to one or more intermediate values and then decreased from the last intermediate value to the final value, wherein the one or more intermediate values are higher than the final value.

The minimization of the transition time is effected in the method in accordance with the present invention preferably by performing an over- or undershoot of the concentration of the varied processing agent with regard to the final concentration to compensate the fact that the polymer grade, for example the molecular weight of the produced polymer, does not instantaneously follow in a polymerization reactor, and in particular in a back-mixing reactor, the change of the concentration of processing agent, such as the initiator, in the feed introduced into the first polymerization reactor. In other words, a higher change of the concentration of the processing agent, such as of the initiator, as necessary for the intended change in polymer grade is initially adjusted to an intermediate value or a plurality of different intermediate values, in order to accelerate the concentration change in the polymerization reactor and as a consequence of which to accelerate the change of the polymer grade to the intended one, before the concentration change of the processing agent is lowered from the intermediate value to the final value corresponding to the second polymer grade. For example, in a method for polymerizing lactide to polylactic acid in the presence of a catalyst, such as tin octoate, and an initiator, such as a high-boiling alcohol, the molecular weight of the polylactic acid shall be increased from a first value to a second, higher value. As the molecular weight of the polylactic acid is inversely proportional to the concentration of the initiator in the feed introduced into the first polymerization reactor, the concentration of the initiator in the feed must be reduced, in order to increase the molecular weight of the polylactic acid. Thus, the first polymer grade is characterized by a first molecular weight of the polylactic acid at the polymerization plant outlet and a first concentration of the initiator in the feed, whereas the second polymer grade is characterized by a second, higher molecular weight of the polylactic acid at the polymerization plant outlet and a second, lower concentration of the initiator in the feed. When the concentration of the initiator in the feed is reduced in one step from the first to the second value, the concentration of the initiator in the polymerization reactor slowly decreases from the first to the second value due to the residence time of the reaction mixture in the polymerization reactor and thus the molecular weight of the polylactic acid comparably slowly increases from the first to the second value leading to a comparable long transition time, during which polymer waste being out of the specification is produced, which has to be discarded. In order to minimize the transition time between the first and second polymer grade, in the method in accordance with the present invention the concentration of the initiator in the feed is not reduced in one step from the first to the second value, but initially from the first value to an intermediate value corresponding to an even lower concentration than the second concentration (i.e. to an undershoot concentration) in order to accelerate the change of the concentration of the initiator in the polymerization reactor from the first to the second value due to the residence time of the reaction mixture in the polymerization reactor and thus to accelerate the change of molecular weight of the polymer to the intended one, before the concentration of the initiator is increased after an appropriate time—i.e. when the molecular weight of the polymer is quite close to the intended second value—from the lower, intermediate concentration to the final initiator concentration.

Since in accordance with the present invention, in the method the one or more intermediate values are maintained for a time which is calculated on the basis of only the residence time in the at least one back-mixing reactor and steady-state correlations between input and output of the reactor and/or of the polymerization plant, an easy and accurate transition between the first polymer grade and the second polymer grade is achieved without the need of a dynamic model calculation and without the need of a controller and one or more sensors for measuring output characteristics, such as the molecular weight of the produced polymer. All in all, the present invention allows to minimize the transition time and/or the polymer waste being out of the specification during the change from a first polymer grade to a second polymer grade in a continuous polymerization process conducted in a polymerization plant with an easy and accurate method.

Steady-state correlations are defined in accordance with the present invention as correlations based on a steady state, wherein steady state means a situation in which all state variables of the polymerization process are constant in spite of ongoing process. In particular, a process parameter, such as e.g. pressure, temperature, the concentration of a reactant or of a product or the like, is at steady state at one point of the polymerization plant, when its value remains constant within a defined tolerance, say when the value does not change more than ±10% and preferably not more than ±1% at that point for at least 15 minutes. Likewise, a polymerization plant is at steady state when at each point of the plant all the process parameters remain constant within the aforementioned tolerance for the aforementioned time period. Accordingly, the outlet polymer product is at steady state when all its properties remain constant at the polymerization plant outlet within the aforementioned tolerance for the aforementioned time period.

According to the above definitions, steady state correlations are defined in the present patent application as correlations between polymer product output properties and plant inputs (such as concentrations of the processing agents) as measured when the polymerization plant is at steady state.

Moreover, a back-mixing reactor is defined in accordance with the present invention as a reactor, in which the reaction product(s) is/are intimately mixed with the feed material(s), which leads to a uniform product and to uniform concentrations of the reactants in the reaction vessel. Preferred examples for a back-mixing reactor are continuous reactors selected from the group consisting of continuous stirred reactors and recycle reactors or loop reactors, respectively. In particular in the case that the reactants are fed as separated streams into the back-mixing reactor, the back-mixing reactor may comprise a premixer with a short residence time upstream of the feed line of the back-mixing reactor, where the different reactant streams are mixed and homogenized before they are entering the back-mixing reactor.

While a catalyst is defined within the scope of the present invention in line with the usual definition of this term in the relevant field as a substance increasing the rate of a chemical reaction without being consumed by the reaction, a co-catalyst is defined—also in line with the usual definition of this term in the relevant field—as a substance that—in combination with a catalyst or after reacting with a catalyst or synergistically acting with the catalyst—enhances the efficiency of the catalyst and thus increases the rate of a chemical reaction.

Moreover, a polymerization initiator is defined in accordance with the present invention as a substance, which starts a polymerization reaction and which—in the absence of side reactions—remains at the reaction end as terminal unit at the polymer chain. In the case that each polymer chain is initiated by an initiator molecule or by a by-product of an initiator molecule, the initiators can be used to tailor the polymer molecular weight.

In addition, a chain-transfer agent is defined in accordance with the present invention as a substance that transfers an active propagating group from one molecule to another molecule. Chain transfer agents are normally used to tailor the polymer molecular weight.

Furthermore, a branching agent is defined in accordance with the present invention as a substance, which introduces or enhances the formation of branches in the polymer architecture.

Molecular weight of a polymer denotes in the sense of the present invention the number average or the weight average molecular weight, which is preferably measured in accordance with the present invention by gel permeation chromatography (GPC) with a Viscotek TDAmax (Malvern) equipped with triple detector, i.e. refractive index, viscometer and right/low angle light scattering detectors, using the solvent enhanced light scattering method, chloroform as polymer solvent, acetone as eluent and calibration of the equipment parameters using PMMA standards.

As set out above, a particular advantage is that the method in accordance with the present invention is performed by the adjustment of one or more intermediates, which values are maintained for a time which is calculated on the basis of only the residence time in the at least one back-mixing reactor and steady-state correlations between input and output of the reactor and/or of the polymerization plant. Therefore, the method in accordance with the present invention is performed without performing dynamic modelling.

In a further development of the present invention, it is suggested to perform the method without the use of a controller, particularly without the use of a PID controller, as well as without performing dynamic modelling.

According to a first particularly preferred embodiment of the present invention, during the variation of the concentration of the at least one added processing agent, the feed concentration of the at least one added processing agent is changed from the first value $c_1$ to one or more intermediate values $\alpha \cdot c_2$ and are then changed from the last intermediate value $\alpha \cdot c_2$ to the final value $c_2$, wherein the one or more intermediate values are lower than the final value so that $\alpha<1$, when the feed concentration has to be decreased from c1 to c2<c1, or the one or more intermediate values are higher than the final value so that $\alpha>1$, when the feed concentration has to be increased from c1 to c2>c1, and wherein the intermediate values $\alpha \cdot c_2$ are maintained for a time $$\Delta t \leq \tau \ln\left(\frac{1 - \alpha c_2/c_1}{(1 \pm \varepsilon - \alpha)c_2/c_1}\right)$$

wherein:

$c_1$ is the first concentration of the at least one added processing agent, $c_2$ is the final concentration of the at least one added processing agent, α is the factor, by which the intermediate values are higher or lower than the final concentration $c_2$, τ is a time period being at least the average residence time of the reaction mixture in the back-mixing reactor and ε is the relative tolerance on the final concentration of the at least one added processing agent, which ensures that the steady state second polymer grade is so that it is considered by the user as being within the specification, i.e. has not more than an acceptable difference to the target second polymer grade, if the inlet concentration of the at least one added processing agent is kept within (1±ε) $c_2$; if $c_2 < c_1$ then +ε>0 has to be used, and if $c_2 > c_1$ then −ε<0 has to be used.

In this context it has to be noted that the choice of the value of α is mainly limited by the equipment operational range. In general, the smaller its value when reducing the processing agent concentration and the higher its value when increasing the processing agent concentration, the shorter will be the transition time and the smaller will be the amount of product being out of the specification.

When the intermediate value(s) for the concentration of the at least one varied processing agent is in one case intentionally lower than the first and final concentration of this compound, the concentration of the at least one varied processing agent is in this embodiment intentionally set to an undershoot concentration during the transition from the transition from the first polymer grade to the second polymer grade. This embodiment is particularly suitable, when the concentration of the initiator is varied during the transition from the first polymer grade to the second polymer grade. Moreover, this embodiment is particularly suitable, if the first polymer grade and the second polymer grade are one or more parameters related to the molecular weight of the polymer and even more preferable, if the first polymer grade as well as the second polymer grade are the molecular weight of the polymer.

Preferably, ε is less than, more preferably less than 0.1 and even more preferably less than 0.05.

Moreover, it is preferred that τ is at most ten times the average residence time in the back-mixing reactor, more preferably at most five times the average residence time in the back mixing reactor, even more preferably at most three times the average residence time in the back mixing reactor and most preferably equal to the average residence time in the back mixing reactor.

In accordance with a particularly preferred embodiment of the present invention, during the variation of the concentration of the at least one added processing agent, the concentration of the at least one added processing agent is decreased from the first value $c_1$ to one or more intermediate values α·$c_2$ and then increased from the last intermediate value α·$c_2$ to the final value $c_2$, wherein the one or more intermediate values are lower than the final value so that α<1. If a polymer having a molecular weight of ±x % from the intended target molecular weight is acceptable and considered to be within the specification and the corresponding tolerance on the initiator feed concentration ensuring that at steady state the polymer will have a molecular weight of ±x % is (1±ε) $c_2$, the concentration of the at least one processing agent is decreased in the aforementioned embodiment from the first value $c_1$ to one or more intermediate value(s) α·$c_2$ for a time $$\Delta t \leq \tau \ln\left(\frac{1 - \alpha c_2/c_1}{(1 + \varepsilon - \alpha)c_2/c_1}\right)$$

wherein $c_1$, $c_2$, ε and τ are as described above, before the concentration of the at least one processing agent is increased to the final value. In order to reduce the transition time, the value of α is the smallest possible as allowed by the technical equipment available, i.e. the value of α is the minimum factor, by which the minimum intermediate value is lower than the final concentration $c_2$. As set out above, the choice of the value of α is mainly limited by the equipment operational range. In general, the smaller its value when reducing the processing agent concentration, the shorter will be the transition time and the smaller will be the amount of product being out of the specification.

The aforementioned embodiment is particularly suitable, if the concentration of the initiator is varied during the transition from the transition from the first polymer grade to the second polymer grade, if the polymer is polylactic acid and if the first polymer grade and the second polymer grade are the molecular weight of the polymer.

Also in this embodiment, ε is preferably less than, more preferably less than 0.1 and even more preferably less than 0.05.

Moreover, it is preferred also in this embodiment that τ is at most ten times the average residence time in the back-mixing reactor, more preferably at most five times the average residence time in the back mixing reactor, even more preferably at most three times the average residence time in the back mixing reactor and most preferably equal to the average residence time in the back mixing reactor.

In accordance with an alternative particularly preferred embodiment of the present invention, during the variation of the concentration of the at least one added processing agent, the concentration of the at least one added processing agent is increased from the first value $c_1$ to one or more intermediate values α·$c_2$ and then decreased from the last intermediate value α·$c_2$ to the final value $c_2$, wherein the one or more intermediate values are higher than the final value so that α>1, and wherein the intermediate values are maintained for a time $$\Delta t \leq \tau \ln\left(\frac{1 - \alpha c_2/c_1}{(1 - \varepsilon - \alpha)c_2/c_1}\right)$$

wherein:

$c_1$, $c_2$, α, ε and τ are as defined above. In order to reduce the transition time, the value of a is the highest possible as allowed by the technical equipment available, i.e. the value of a is the maximum factor, by which the maximum intermediate value is higher than the final concentration $c_2$. As set out above, the choice of the value of a is mainly limited by the equipment operational range. In general, the higher its value when increasing the processing agent concentration, the shorter will be the transition time and the smaller will be the amount of product being out of the specification.

Also in this embodiment, ε is preferably less than, more preferably less than 0.1 and even more preferably less than 0.05.

Moreover, it is preferred also in this embodiment that τ is at most ten times the average residence time in the back-mixing reactor, more preferably at most five times the average residence time in the back mixing reactor, even more preferably at most three times the average residence time in the back mixing reactor and most preferably equal to the average residence time in the back mixing reactor.

As the intermediate value(s) for the concentration of the at least one varied processing agent is in this case intentionally higher than the first and final concentration of this compound, the concentration of the at least one varied processing agent is in this embodiment intentionally set to an overshoot concentration during the transition from the transition from the first polymer grade to the second polymer grade. This embodiment is particularly suitable, when the concentration of the initiator is varied during the transition from the first polymer grade to the second polymer grade. Moreover, this embodiment is particularly suitable, if the first polymer grade and the second polymer grade are one or more parameters related to the molecular weight of the polymer and even more preferable, if the first polymer grade as well as the second polymer grade are the molecular weight of the polymer.

The aforementioned embodiment is particularly suitable, if the concentration of the initiator is varied during the transition from the transition from the first polymer grade to the second polymer grade, if the polymer is polylactic acid and if the first polymer grade and the second polymer grade are the molecular weight of the polymer.

In principle, the first polymer grade and the second polymer grade are not particularly limited as long as they are one or more parameters related to the molecular weight of the polymer to be produced and/or one or more parameters related to the composition of the polymer to be produced and/or one or more parameters related to the structure of the polymer to be produced and/or one or more parameters related to the amount of the polymer to be produced. Preferably, the first polymer grade and the second polymer grade are each selected from the group consisting of the molecular weight of the polymer to be produced, the polydispersity of the polymer to be produced, the melt flow index of the polymer to be produced, the density of the polymer to be produced, the viscosity of the polymer to be produced, degree of branching of the polymer to be produced, the solid concentration of the polymer to be produced, the degree of branching of the polymer to be produced, the stereochemical arrangement of the monomers in the polymer to be produced and arbitrary combinations of two or more of the aforementioned grades.

More preferably, the first polymer grade and the second polymer grade are each the number average molecular weight or the weight average molecular weight of the polymer to be produced, the polydispersity of the polymer to be produced and/or the melt flow index of the polymer to be produced and most preferably, the first polymer grade and the second polymer grade are each the number average molecular weight or the weight average molecular weight of the polymer to be produced.

Also concerning the kind of back-mixing reactor, the present patent invention is not particularly limited. Good results are obtained, when the at least one back-mixing reactor is a reactor selected from the group consisting of loop reactors and continuous stirred tank reactors, which are used in a polymerization plant possibly also in combination with one or more plug flow reactors. More preferably, the polymerization plant comprises two reactors, namely a loop reactor and downstream of the loop reactor a plug flow reactor.

Preferably, a premixer is installed before the back-mixing reactor and particularly before the continuous back-mixing reactor in order to homogenize the feed streams to the back-mixing reactor.

The present invention may be used for reducing the transition time and/or the polymer waste being out of the specification during the change from a first polymer grade to a second polymer grade in a continuous polymerization process conducted in a polymerization plant for preparing any kind of known polymer. In particular, the polymer may be a thermoplastic polymer or a thermosetting polymer. Suitable results are for example achieved, when the at least one monomer is selected from the group consisting of lactide, L-lactide, D-lactide, meso-lactide, combinations of L-lactide, D-lactide and meso-lactide, cyclic monomers, styrene, vinyl acetate, acrylates, methacrylates, such as methyl-methacrylate, ethylene, propylene, butylene, a combination of an isocyanate compound and a polyol, amides, ε-caprolactone, glycolide and mixtures of one or more of the aforementioned monomers.

Notably good results are achieved, when the at least one monomer is selected from the group consisting of lactide, L-lactide, D-lactide, meso-lactide and mixtures of one or more of the aforementioned monomers, i.e. when the polymer is polylactic acid.

There is no particular limitation of the present patent application concerning the chemical nature of the catalyst, which may be used in the polymerization reaction as processing aid, and, the concentration of which may be varied during the transition from the first polymer grade to the second polymer grade. In particular, when the polymer is polylactic acid, the at least one catalyst is preferably at least one organometallic compound comprising a metal selected from the group consisting of magnesium, titanium, zinc, aluminum, indium, yttrium, tin, lead, antimony, bismuth and any combination of two or more of the aforementioned metals, wherein the at least one organometallic compound preferably comprises as organic residue a residue selected from the group consisting of alkyl groups, aryl groups, halides, oxides, alkanoates, alkoxides and any combination of two or more of the aforementioned groups. More preferred as catalyst are halides, oxides, alkanoates, alkoxides of the aforementioned metals as well as alkyl- or aryl-group bearing compounds of these metals. Even more preferred polymerization catalysts are tin octoate and tin stearate, wherein tin octoate, i.e., Sn(II)-2-ethylhexanoate, is most preferred. Other examples of catalysts for the ring opening polymerization of lactide are, but not limited to, azo- and diazo-compounds such as 4-pyrrolidinopyridine, 1,8-diazabicycloundecene, 1,5,7-triazabicyclo[4.4.0]dec-5-ene, 7-methyl-1,5,7-triazobicyclo[4.4.0]dec-5-ene, 2-tert-butyl-imino-2-diethylamino-1,3-dimethylperhydro-1,3,2-diazaphosphorine.

Even if the concentration of the catalyst may be varied during the change from the first polymer grade to the second polymer grade, it is preferred that the catalyst concentration is maintained at the same value during the first polymer grade production, during the transition from the first polymer grade to the second polymer grade and during the second polymer grade production.

Usually, the polymerization mixture in the at least one back-mixing reactor contains 0.0001 to 0.1% by weight and more preferably 0.0025 to 0.02% by weight amount of the catalyst based on the total weight of the reaction mixture.

In a further development of the present invention, it is suggested that at least one initiator is added before and/or during the polymerization process into the at least one back-mixing reactor as processing agent. Preferably, the initiator is added in combination with at least one catalyst as processing agent before and/or during the polymerization process into the at least one back-mixing reactor. Particularly suitable examples for initiator are, in particular for the case that the polymer is polylactic acid, compounds, which comprise at least one carboxyl group and/or hydroxyl group, such as preferably a compound selected from the group consisting of water, alcohols, lactic acid, oligomers of a cyclic ester, polymers of a cyclic ester and any combination of two or more of the aforementioned substances. As oligomers and/or polymers of a cyclic ester in particular an oligomers and/or polymer of lactic acid is preferred. Examples for suitable alcohols are propanol, butanol, hexanol, 2-ethyl-1-hexanol, octanol, dodecanol, propanediol and glycerol, of which 1-hexanol is preferred and 2-ethyl-1-hexanol is most preferred. Moreover, examples for initiators in radical polymerizations are peroxides, hydroperoxides, azo-compounds, disulfides, tetrazenes and combinations of two or more of the aforementioned compounds. Other examples of initiators in radical polymerizations are redox systems, such as peroxides in combination with ferrous ($Fe^{2+}$) ions, peroxides in combination with other metallic ions, such as $Cr^{2+}$, $V^{2+}$, $Ti^{3+}$, $Co^{2+}$, $Cu^{2+}$, or peroxides in combination with amines. Suitable examples for peroxides are acetyl peroxides, benzoyl peroxides and alkyl peroxides, such as cumyl and t-butyl peroxides, whereas suitable examples for hydroperoxides are t-butyl hydroperoxide, cumyl hydroperoxide and peresters. As azo-compound e.g. 2,2'-azoisobutyronitrile, 2,2'-azobis(2,4-dimethylpentanenitrile), 4,4'-azobis(4-cyanovaleric acid) and/or 1,1'-azobis (cylohexanecarbonitrile) may be used.

It is preferable that the concentration of the initiator is varied during the change from the first polymer grade to the second polymer grade as a function of time from a first value associated with the first polymer grade to a final value associated with the second polymer grade. This embodiment is particularly suitable, if the first polymer grade and the second polymer grade are each one or more parameters related to the molecular weight of the polymer to be produced, and more preferably, if the first polymer grade and the second polymer grade are each the number average molecular weight or the weight average molecular weight of the polymer to be produced, the polydispersity of the polymer to be produced and/or the melt flow index of the polymer to be produced.

The concentration of the initiator may be for example varied within a numeric value range of 0.0001 to 5% by weight and preferably of 0.0025 to 0.1% by weight based on the total weight of the reaction mixture.

In a further development of the present invention, it is suggested that:
i) the at least one monomer is selected from the group consisting of lactide, L-lactide, D-lactide, meso-lactide and mixtures of one or more of the aforementioned monomers,
ii) the first polymer grade and the second polymer grade are the molecular weight of the polylactic acid polymer to be produced and
iii) as processing aid at least one catalyst and at least one initiator are added, wherein the concentration of the at least one initiator is varied as a function of time from a first value associated with the molecular weight of the polylactic acid polymer to a final value associated with the molecular weight of the polylactic acid polymer to be produced.

Particularly in this case, the over- or undershooting of the concentration of the processing agent, the concentration of which is varied during the transition from the first polymer grade to the second polymer grade, is done for a degree and period of time as described above.

In accordance with an alternative preferred embodiment of the present invention, it is suggested that in radical polymerizations:
i) the at least one monomer is selected from the group consisting of styrene, vinyl acetate, acrylates, methacrylates, such as methyl-methacrylate, ethylene, propylene, butylene and mixtures of one or more of the aforementioned monomers,
ii) the first polymer grade and the second polymer grade are the molecular weight of the polymer to be produced and
iii) as processing aid at least one catalyst and at least one polymerization initiator or of the at least one chain transfer agent are added, wherein the concentration of the at least one polymerization initiator or of the at least one chain transfer agent is varied as a function of time from a first value associated with the molecular weight of the polymer to a final value associated with the molecular weight of the polymer to be produced.

Preferred examples for chain transfer agents are compounds selected from the group consisting of molecules having one or more benzylic C—H groups, primary halides, secondary halides, amines, carbonyl compounds, alcohols, carbon tetrachloride, carbon tetrabromide, disulfides and combinations of two or more of the aforementioned compounds. Suitable examples for molecules having one or more benzylic C—H groups are toluene, ethylbenzene and isopropylbenzene, whereas a suitable example for primary halides is n-butyl iodide, suitable examples for amines include butylamine and triethylamine and suitable examples for disulfides are di-n-butylsulfide and di-n-butyl disulfide.

Specific embodiments in accordance with the present invention are now described with reference to the appended drawings.

FIG. 1 is a schematic drawing showing the change of the concentration of an initiator in a continuous stirred tank reactor (top figure, bold line) in dependency of a change of the concentration of the initiator in the feed introduced into the continuous stirred tank reactor (top figure, thin line) as well as a schematic drawing showing the corresponding change of a property, P, such as the melt flow index of the polymer product at the outlet of the continuous back-mixing reactor (bottom figure, bold line) performed in accordance with a prior art method.

FIG. 2 is a schematic drawing showing the change of the concentration of an initiator in a continuous stirred tank reactor (top figure, bold line) in dependency of a change of the concentration of the initiator in the feed introduced into the continuous stirred tank reactor (top figure, thin line) as well as a schematic drawing showing the corresponding change of a property, P, such as the melt flow index of the polymer product at the outlet of the continuous back-mixing reactor (bottom figure, bold line) performed in accordance with the present invention in comparison to the change of the property of polymer product at the outlet of the continuous stirred tank reactor as shown in FIG. 1 (dashed bold line).

Figure 5:
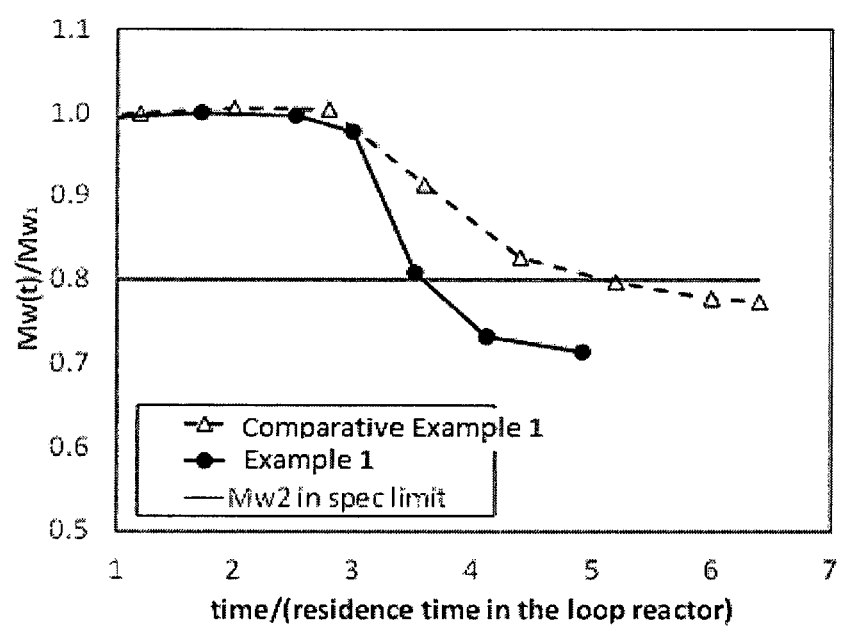

FIG. 5 shows the evolution of the weight average molecular weight for samples collected at the outlet of a polymerization apparatus vs. time from a first polymer grade (Mw (t)Mw1=1) to a second polymer grade (below the horizontal line) of example 1 and comparative example 1. The data shown represent the evolution obtained with the standard step change method (Δ) known in the prior art and with the method in accordance with the present invention (●).

Figure 1:
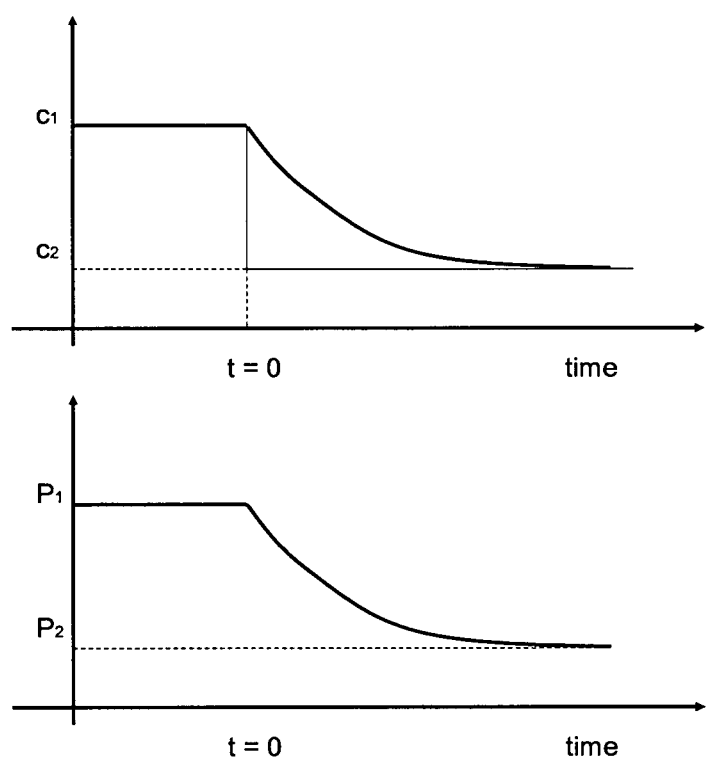

FIG. 1 shows the change of the concentration of an initiator in a continuous stirred tank reactor (CSTR) (top figure, bold line) in dependency of a change of the concentration of the initiator in the feed introduced into the CSTR (top figure, thin line) performed in accordance with a prior art method. As shown by the thin line, the concentration of an initiator in the feed introduced into the CSTR is stepwise decreased at the time t=0 from a first value $c_1$ to a final value $c_2$. Apart from the initiator, the feed includes lactide as monomer and catalyst, namely tin octoate octoate. Due to the residence time of the reaction mixture in the CSTR, the concentration of the initiator within the CSTR only slowly changes, as shown by the bold line, and reaches the final concentration $c_2$ only with a significant delay. The time period between t=0 and the time, when the concentration of the initiator within the CSTR reaches $c_2$, is the transition time of the initiator in the CSTR. Correspondingly, the property P of the polymer produced in the CSTR also changes with time. The time period needed for the polymer property P at the outlet of the reactor to change from the starting value to the final steady state value is the transition time of the polymer property P. In more complex polymerization plants, in which additional reactors and equipments are present downstream the CSTR reactor, the polymer property P is preferably measured at the plant outlet rather than at the CSTR outlet.

In accordance with the present invention, the transition time is significantly reduced by intentionally and accurately changing the concentration of the initiator in the feed introduced into the CSTR firstly to an intermediate value $\alpha \cdot c_2$ being lower than the intended final concentration $c_2$, wherein the intermediate value $\alpha \cdot c_2$ is maintained for a time $$\Delta t \leq \tau \ln\left(\frac{1 - \alpha c_2/c_1}{(1+\varepsilon - \alpha)c_2/c_1}\right)$$

wherein:
$c_1$, $c_2$, $\alpha$, $\varepsilon$ and $\tau$ are as defined above.

Figure 2:
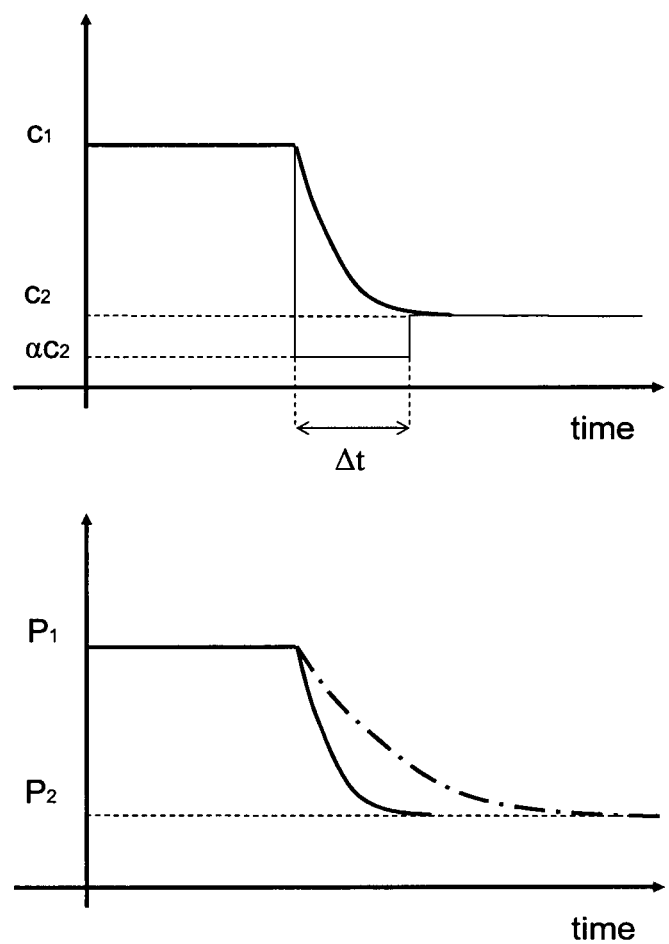

Due to this higher change of the concentration of the initiator as that from the first to the final concentration value, the concentration change of the initiator is accelerated in the polymerization reactor and as a consequence thereof also the change of the polymer grade from the first grade, characterized by the polymer property P1, to the intended one, characterized by the polymer property P2, is accelerated. As shown in FIG. 2, on account of the intermediate undershoot concentration of the initiator (FIG. 2, top), the final polymer grade property in the polymerization reactor is reached, as shown by the bold line in FIG. 2, bottom, earlier than in the case of a stepwise concentration decrease (cf. FIG. 2, dot-dashed bold line), which leads to a significant reduction in the transition time.

Figure 3:
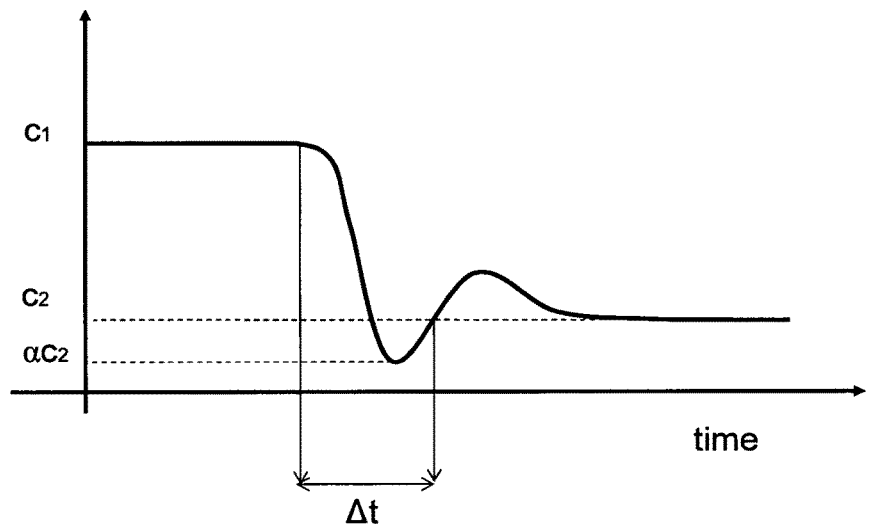
FIG. 3 is a schematic drawing showing the change of the concentration of an initiator in the feed introduced into the continuous stirred tank reactor in accordance with another embodiment of the present invention.

FIG. 3 shows a more complex curve for the change of the concentration of an initiator in the feed introduced into the CSTR in accordance with another embodiment of the present invention, in which the concentration of the initiator in the feed introduced into the CSTR is not only reduced to one intermediate concentration corresponding to $\alpha \cdot c_2$ as shown in FIG. 2, but to more intermediate concentrations $c_2$. In such a case, the time of over/undershoot in the feed, $\Delta t$, is calculated from the first instant, when the feed concentration exits the $(1\pm\varepsilon)\cdot c_1$-range, with $\varepsilon$ being the tolerance in the feed to obtain at steady state the polymer property P1, to the first next instant, after the intermediate value $\alpha \cdot c_2$, when the feed concentration enters the $(1\pm\varepsilon)$ $c_2$-range, with a being the tolerance in the feed to obtain at steady state the polymer property P2. The corresponding a is calculated using the maximum (minimum) value reached by the feed concentration during the transition from a lower (higher) to a higher (lower) set point.

Subsequently, the present patent application is illustrated by means of non-limiting examples.

Example 1

Figure 4:
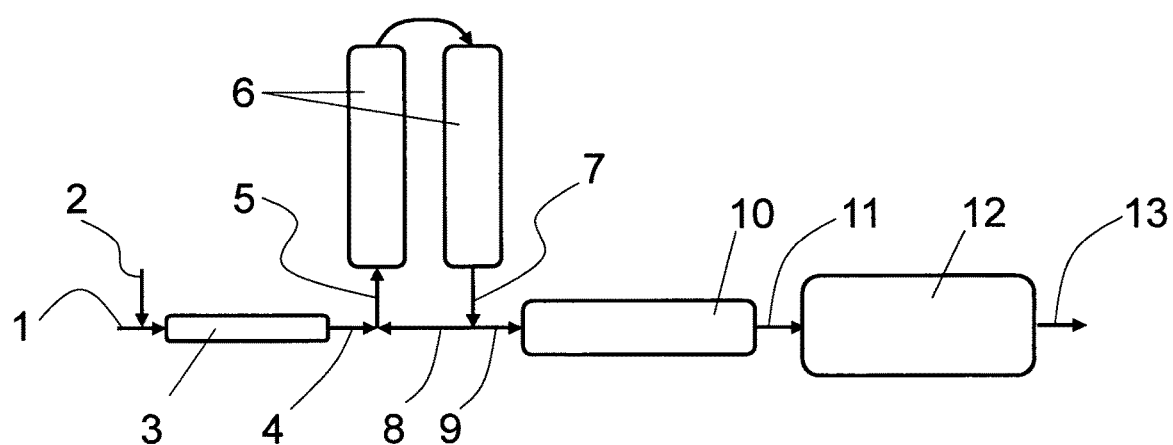
FIG. 4 is a schematic drawing showing a polymerization apparatus suitable for performing the method in accordance with the present invention, as used in example 1.

FIG. 4 shows a schematic drawing (not to scale) of a polymerization apparatus for the continuous production of polylactic acid from the corresponding cyclic diester monomer (actide) according to a preferred embodiment.

The actide monomer feed 1 is mixed with a stream of the processing agent, such as but not limited to, polymerization catalyst and/or initiator 2 into a premixer unit 3. The so-obtained premixed phase 4 is then pumped to the loop reactor 6. A fraction of the loop outlet stream 8 is then pumped back and fed to the inlet of the loop reactor together with the feed stream 4. The remaining fraction of the loop outlet stream 9 is pumped to a plug flow reactor 10, where the conversion further increases up to the targeted final value. At the outlet of the plug flow reactor, the reacted stream containing mainly polymer 11, is pumped to a final unit 12, where the manufacturing process is completed. The final unit 12 can comprise one or more subunits selected from but not limited to one or more devolatilization steps, one or more units for mixing and/or blend additives and/or other polymers in order to improve the mechanical, rheological and/or thermal properties, finishing and/or pelletization units, drying and/or crystallization units, before the final product is collected at the outlet of the polymerization apparatus 13. The types and amount of subunits present in 12 depends on the manufacturing needs.

In another embodiment the polymerization apparatus may contain separate inlet streams for the catalyst and the initiator to the premixer unit.

In another embodiment of the polymerization apparatus, the premixer unit can be absent and the feed streams to the reactor can be mixed in a separate unit before feeding them to the loop reactor.

In another embodiment of the polymerization apparatus, the lactide and the other chemical agents are fed separately directly into the loop reactor.

In the preferred polymerization apparatus embodiment shown in FIG. 4, the average residence time in the premixer unit 3, defined as volume of premixer unit divided by the flowrate feed to the premixer unit, is less than ½, more preferably less than ⅕, and even most preferably less than 1/10 than the average residence time in the loop reactor 6, defined as the ratio between the loop reactor volume and the total feed flowrate (1+2, or 4). But not limited to the preferred conditions, the present invention can be applied also to cases where larger premixers are used, e.g. with residence time larger than ½ or comparable to the residence time in the loop.

The concentration of the initiator feed to the loop reactor 4 is calculated as the ratio of the flow rates fed to the premixer as:

$$C_1 = F_I/(F_I + F_{cat} + F_{Lactide}) \qquad 5$$

wherein $C_1$ is the initiator concentration in the feed to the loop reactor used to reach the first steady state conditions, $F_I$ is the flowrate of (pure) initiator in stream 1, $F_{cat}$ is the flowrate of (pure) catalyst in the stream 1 and $F_{Lactide}$ is the flowrate of lactide 2.

It has to be noted that the equation reported to calculate the concentration of initiator fed to the reactor can be calculated with the same formula also when, according to another embodiment above, the different streams of monomer and agents are fed through separate streams with their respective flow rates, directly into the loop reactor, and then mixed together with the stream circulating in the loop reactor 5. The lactide and the agents can be fed as separated streams to different points of the loop reactor too.

In any case, the concentration of a given chemical agent fed to the continuously mixing reactor is calculated according to standard definitions as the concentration of the agent in the whole amount of material actually entering the continuously mixing reactor volume (6), independently from the possibly present premixing steps and from the number of streams and agents which may constitute the overall feed before entering the continuously mixing reactor volume.

In this example, liquid lactide was pumped continuously to the premixer unit of a polymerization apparatus as depicted in FIG. 4 at a constant flowrate of $F_{lactide}$=25 kg/h.

At the inlet of the premixer, a controlled amount of catalyst (tin octoate) and of initiator (ethyl-hexanol) was fed via the streamline 1.

The streams of lactide and catalyst and initiator were kept constant until the plant operated under steady state conditions and the molecular weight of the polylactic acid collected at the outlet of the apparatus 13, $Mw_1$, corresponding to the specification of a first polymer grade within the accepted tolerance, was constant in time.

The apparatus was operated under steady state conditions until the desired amount of the first polymer grade was produced.

Then, to switch the production from this first polymer grade characterized by a first weight average molecular weight $Mw_1$, to a second polymer grade characterized by a second molecular weight $Mw_2$=0.67×$Mw_1$ with tolerance of 20% ($\varepsilon$=0.2), the feed flowrate of initiator to the polymerization plant was first changed to an intermediate value $\alpha C_2$, with $\alpha$=1.333 and after a time $\Delta t$ it was then decreased back to the final value $C_2$ associated with the production of the second polymer grade characterized by the second molecular weight $Mw_2$.

Because, as known in prior art, in some cases it can be assumed as a reasonable estimate that the molecular weight is inversely proportional to the amount of initiator used, the flowrate of initiator was changed such that the second final concentration value of the initiator in the feed was $C_2$=1.5×$C_1$.

According to the present invention, the intermediate concentration value had to be maintained for a time calculated:

$$\Delta t \leq \tau \ln\left(\frac{1 - \alpha c_2/c_1}{(1 - \varepsilon - \alpha)c_2/c_1}\right)$$

which, in the present example using $\tau$ equal to five times the residence time in the loop reactor gives:

$$\Delta t \leq \tau \ln\left(\frac{1 - 1.333 \cdot 1.5}{(1 - 0.2 - 1.333)1.5}\right) = 0.223\tau$$

Accordingly, $\Delta t$=0.184$\tau$ was used, $\tau$ equal to five times the residence time in the loop reactor.

FIG. 5 reports the measured weight average molecular weights vs. time as collected at the outlet of the polymerization plant 13.

To allow a fair comparison of the two sets of data, the time scale was normalized by the average residence time in the loop and the value of time=0 was assigned to the instant when the initiator concentration was firstly changed from the first value $c_1$ to a second value $c_2$ (step-change) or to a second value $\alpha c_2$ (new method), respectively.

The horizontal line in the figure represents the limit below which the second polymer molecular weight grade was considered within specification for a specific application. This limit was calculated as 20% higher than the targeted molecular weight, as reported above.

The experimental results evidence that the with the new procedure the molecular weight as a function of time Mw(t) decreases much more rapidly to the new steady state than with the standard procedure.

This way, the transition from a first polymer grade with a first molecular weight to a second polymer grade with a second molecular weight can be performed faster and the amount of off spec material produced during the shorter transition time results remarkably reduced.

Comparative Example 1

Liquid lactide was pumped continuously to the premixer unit of a polymerization apparatus (as depicted in FIG. 4) at a constant flowrate of $F_{lactide}$=25 kg/h.

At the inlet of the premixer, a controlled amount of catalyst (tin octoate) and of initiator (ethyl-hexanol) was fed via the streamline 1.

The streams of lactide and catalyst and initiator were kept constant until the plant operated under steady state conditions and the molecular weight of the polylactic acid collected at the outlet of the apparatus 13, $Mw_1$, corresponding to the specification of a first polymer grade within the accepted tolerance, was constant in time.

The apparatus was operated under steady state conditions until the desired amount of the first polymer grade was produced.

Then, to switch the production from this first polymer grade characterized by the first weight average molecular weight $Mw_1$, to a second polymer grade characterized by a second weight average molecular weight, $Mw_2$, the feed flowrate of the initiator to the polymerization plant was changed to such an extent that its concentration in the feed to the loop reactor changed stepwise from the first value $C_1$ associated to the first molecular weight $Mw_1$, to a second value $C_2$, associated with a second molecular weight, $Mw_2$=0.65×$Mw_1$. Because, as known in prior art, in some cases it can be assumed as a reasonable estimate that the molecular weight is inversely proportional to the amount of initiator used, the flowrate of initiator was changed such that the second concentration value of the initiator in the feed was $C_2$=1.54×$C_1$.

The time evolution of the molecular weight at the outlet of the polymerization plant 13 is shown in FIG. 5.

The invention claimed is:

1. A method for reducing transition time and/or polymer waste being out of specification during a change from a polymer having a first polymer grade to a polymer having a second polymer grade in a continuous polymerization process conducted in a polymerization plant having a back-mixing reactor, the method comprising the steps of adding into the back-mixing reactor a monomer and a processing agent comprising a catalyst, a co-catalyst, a polymerization initiator, a co-monomer, a chain-transfer agent, a branching agent, a solvent, or any combination thereof before and/or during the polymerization process, wherein the concentration of the processing agent introduced into the back-mixing reactor is varied as a function of time from a first value associated with the polymer having the first polymer grade to a final value associated with the polymer having the second polymer grade, wherein:

the polymer having the first polymer grade and the polymer having the second polymer grade have different polymer parameters, wherein the different polymer parameters are molecular weight of the polymer, composition of the polymer, structure of the polymer, amount of the polymer, or any combination thereof, during the variation of the concentration of the processing agent from the first value to the final value the concentration is adjusted to an intermediate value, wherein the intermediate value is closer to the final value than to the first value, wherein the absolute difference between the intermediate value from the first value is greater than the absolute difference between the final and the first value, wherein the intermediate value is maintained for a time which is calculated on the basis of only residence time in the back-mixing reactor and steady-state correlations between input and output of the back-mixing reactor and/or of the polymerization plant, the monomer is a cyclic ester, the method is performed without performing dynamic modelling, and during the variation of the concentration of the processing agent, the concentration of the processing agent is either:

(a) decreased from the first value $c_1$ to the intermediate value $\alpha \cdot c_2$ and then increased from the intermediate value $\alpha \cdot c_2$ to the final value $c_2$, wherein the intermediate value $\alpha \cdot c_2$ is lower than the final value so that $\alpha<1$, and wherein the intermediate value is maintained for a time $$\Delta t \leq \tau \ln\left(\frac{1-\alpha c_2/c_1}{(1+\varepsilon-\alpha)c_2/c_1}\right)$$

wherein:

$c_1$ is the first concentration of the processing agent,
$c_2$ is the final concentration of the processing agent,
$\alpha$ is the minimum factor, by which the minimum intermediate value is lower than the final concentration $c_2$,
$\tau$ is a time period being at least the average residence time of the reaction mixture in the back-mixing reactor and
$\varepsilon$ is the relative tolerance on the final concentration of the processing agent, or (b) increased from the first value $c_1$ to the intermediate value $\alpha \cdot c_2$ and then decreased from the intermediate value $\alpha \cdot c_2$ to the final value $c_2$, wherein the intermediate value $\alpha \cdot c_2$ is higher than the final value so that $\alpha>1$, and wherein the intermediate value is maintained for a time $$\Delta t \leq \tau \ln\left(\frac{1-\alpha c_2/c_1}{(1-\varepsilon-\alpha)c_2/c_1}\right)$$

wherein:

$c_1$ is the first concentration of the processing agent,
$c_2$ is the final concentration of the processing agent,
$\alpha$ is the maximum factor, by which the maximum intermediate value is higher than the final concentration $c_2$,
$\tau$ is a time period being at least the average residence time of the reaction mixture in the back-mixing reactor and
$\varepsilon$ is the relative tolerance on the final concentration of the processing agent.

2. The method in accordance with claim 1, wherein the method is performed without the use of a controller.

3. The method in accordance with claim 1, wherein $\varepsilon$ is less than 0.2.

4. The method in accordance with claim 1, wherein $\tau$ is at most ten times the average residence time in the back-mixing reactor.

5. The method in accordance with claim 1, wherein the different polymer parameters are molecular weight of the polymer, polydispersity of the polymer, melt flow index of the polymer, density of the polymer, viscosity of the polymer, degree of branching of the polymer, solid concentration of the polymer, stereochemical arrangement of the monomers in the polymer, or any combination thereof.

6. The method in accordance with claim 5, wherein the different polymer parameters are number average molecular weight and/or weight average molecular weight of the polymer.

7. The method in accordance with claim 1, wherein the back-mixing reactor is a a loop reactor, and/or a continuous stirred tank reactor.

8. The method in accordance with claim 1, wherein a premixer is installed before the back-mixing reactor in order to homogenize the feed streams to the back-mixing reactor.

9. The method in accordance with claim 1, wherein the monomer is selected from the group consisting of lactide, L-lactide, D-lactide, meso-lactide, combinations of L-lactide, D-lactide and meso-lactide.

10. The method in accordance with claim 1, wherein at least one catalyst is used, wherein the catalyst is at least one organometallic compound comprising a metal selected from the group consisting of magnesium, titanium, zinc, aluminum, indium, yttrium, tin, lead, antimony, and bismuth.

11. The method in accordance with claim 1, wherein an initiator is used, wherein the initiator is a compound comprising a carboxyl group and/or a hydroxyl group.

12. The method in accordance with claim 1, wherein i) the monomer is selected from the group consisting of lactide, L-lactide, D-lactide, meso-lactide and mixtures of one or more of the aforementioned monomers, ii) the different polymer parameters are number average molecular weight and/or weight average molecular weight of the polylactic acid polymer and iii) as the processing agent at least one catalyst and at least one initiator are added, wherein the concentration of the at least one initiator is varied as a function of time from a first value associated with the molecular weight of the polylactic acid polymer to a final value associated with the molecular weight of the polylactic acid polymer to be produced.

* * * * *